US009268697B2

(12) United States Patent
Pardo et al.

(10) Patent No.: US 9,268,697 B2
(45) Date of Patent: Feb. 23, 2016

(54) SNOOP FILTER HAVING CENTRALIZED TRANSLATION CIRCUITRY AND SHADOW TAG ARRAY

(71) Applicants: Ilan Pardo, Ramat-Hasharon (IL); Niranjan Cooray, Folson, CA (US); Stanislav Shwartsman, Haifa (IL); Shlomo Raikin, Ofer (IL)

(72) Inventors: Ilan Pardo, Ramat-Hasharon (IL); Niranjan Cooray, Folson, CA (US); Stanislav Shwartsman, Haifa (IL); Shlomo Raikin, Ofer (IL)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 13/730,956

(22) Filed: Dec. 29, 2012

(65) Prior Publication Data

US 2014/0189254 A1    Jul. 3, 2014

(51) Int. Cl.
*G06F 12/08* (2006.01)
*G06F 12/10* (2006.01)

(52) U.S. Cl.
CPC ........ *G06F 12/0822* (2013.01); *G06F 12/0831* (2013.01); *G06F 12/1027* (2013.01); *G06F 12/1063* (2013.01)

(58) Field of Classification Search
None
See application file for complete search history.

(56) References Cited

U.S. PATENT DOCUMENTS

| 6,038,647 | A  | * | 3/2000  | Shimizu ........................ 711/168 |
| 2004/0034756 | A1 | * | 2/2004  | Clark et al. .................... 711/202 |
| 2005/0273575 | A1 | * | 12/2005 | Mukherjee ..................... 711/207 |
| 2008/0183972 | A1 | * | 7/2008  | Dieffenderfer ................ 711/146 |
| 2009/0083493 | A1 | * | 3/2009  | Kinter ............................ 711/141 |

* cited by examiner

*Primary Examiner* — Gary Portka
(74) *Attorney, Agent, or Firm* — Nicholson De Vos Webster & Elliott, LLP

(57) ABSTRACT

A processor is described that includes a plurality of processing cores. The processor includes an interconnection network coupled to each of said processing cores. The processor includes snoop filter logic circuitry coupled to the interconnection network and associated with coherence plane logic circuitry of the processor. The snoop filter logic circuitry contains circuitry to hold information that identifies not only which of the processing cores are caching specific cache lines that are cached by the processing cores, but also, where in respective caches of the processing cores the cache lines are cached.

20 Claims, 4 Drawing Sheets

SNOOP FILTER HAVING CENTRALIZED TRANSLATION CIRCUITRY AND SHADOW TAG ARRAY

FIELD OF INVENTION

The field of invention relates generally to the computing sciences, and, more specifically, to a snoop filter having centralized translation circuitry and shadow tag array.

BACKGROUND

FIG. 1 shows the architecture of a standard multi-core processor design 100 implemented in a semiconductor chip. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores 101_1 to 101_N contain one or more instruction execution pipelines for executing program code instructions. The interconnect network 102 serves to interconnect each of the cores 101_1 to 101_N to each other as well as the other components 103, 104, 105, 106.

The last level caching system 103 serves as a last layer of cache in the processor before instructions and/or data are evicted to system memory 108. The memory controller 104 reads/writes data and instructions from/to system memory 106. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Other functional blocks of significance (phase locked loop (PLL) circuitry, power management circuitry, etc.) are not depicted in FIG. 1 for convenience.

FIGURES

The present invention is illustrated by way of example and not limitation in the figures of the accompanying drawings, in which like references indicate similar elements and in which.

DETAILED DESCRIPTION

Figure 1:
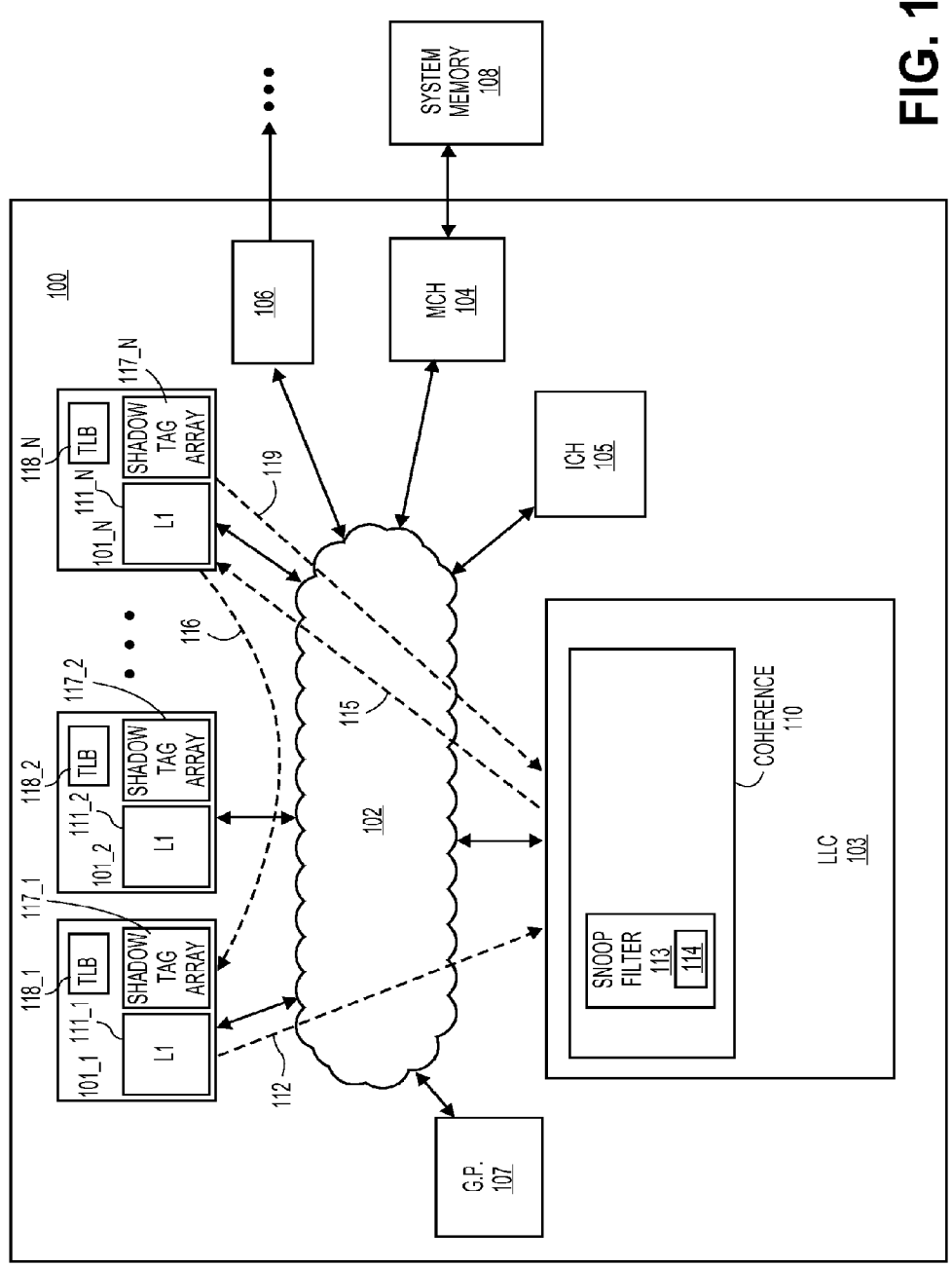
FIG. 1 shows a conventional multi-core processor (prior art)

As observed in FIG. 1, the last level caching system 103 includes coherence plane logic circuitry 110 that helps implement a cache coherence protocol such as a MESI cache coherence protocol that characterizes cache lines as Modified (M), Exclusive (E), Shared (S) and Invalid (I). Also, an L1 cache 111_1 is observed within each of the processor cores 101_1 to 101_N. If one of the processing cores (e.g., core 101_1) desires a cache line but the desired cache line is not within its local L1 cache, the core issues a "snoop request" 112 to snoop filter logic circuitry 113 within the coherence plane logic 110. The snoop filter 113 has register and/or other storage circuitry space 114 that keeps track of which cache lines are within the respective L1 caches of each of the cores 101_1 to 101_N in the processor 100.

If storage circuitry 114 indicates that one of the other processors (e.g., core 101_N) has the desired cache line in its L1 cache, the snoop filter logic forwards the snoop request to that core 115. The core that receives the forwarded snoop request sends 116 the desired cache line to the requesting core and confirms 119 the transaction with the snoop filter 113 which updates an entry in storage circuitry 114 to indicate that the requesting core has the cache line. If the cache line is in the Exclusive state, the update to the entry in storage circuitry 114 includes removing the identity of the core that had the cache line (core 101_N) and replacing it with the identity of the requesting core that has newly received the cache line (101_1). If the cache line is in a Shared (S) stare, the update to the entry may include adding the identity of the requester core along with the identity of the core that had the cache line.

Each core is also observed to include a "shadow tag array" 117_1 through 117_N. The shadow tag array essentially includes the "tag" of each cache line that is respectively cached in the processor' L1 cache. As is understood in the art, a tag of a cache line typically includes the physical address of the cache line (which, in many computer systems, corresponds to the cache line's address in system memory). The tag of a cache line also typically includes information that identifies and/or can be used to identify where the cache line is stored in the cache. For instance, shadow tag array 117_N of core 101_N includes, for each cache line in L1 cache 111_N, the cache line's physical address and information describing where the cache line can be found in the L1 cache 111_N.

The shadow tag array can be used by a core that receives a snoop request to quickly determine if it has the requested cache line within its cache. For example, when core 101_N receives forwarded cache snoop 115, core 101_N looks into shadow tag array 117_N to see if it has the requested cache line in cache 111_N. Here, it is pertinent to point out that a snoop request (both the original 112 and forwarded 115 snoop requests) includes the physical address of the requested cache line (which corresponds to the cache line' storage location when it, or a copy of it, is stored in system memory 108). The "hit" in the shadow tag array on the physical address yields the tag which identifies where in the L1 cache 111_N the desired cache line resides. This information is then used to fetch the desired cache line from the cache 111_N so that it can be forwarded 116 to the requesting core 101_1.

Note also that each of the cores include a translation lookaside-buffer (TLB) 118_1 through 118_N. As is understood in the art, a TLB is used to translate a virtual address to a physical address. Here, when different programs (e.g., different application software programs) run out of system memory 108, the addresses that are called out by the instructions of these programs typically overlap (e.g., because the respective compiler for each program targeted memory space starting at an address of 0). As such, the object code of the programs refer to overlapping/same address of system memory space 108. The programs themselves are stored in different sections of memory 108 that do not overlap. A TLB, therefore, is used to translate a "virtual" address called out by an actual instruction to the actual physical address in system memory 108 where the data or instruction that is called out actually resides.

According to an approach, a processor cache such as the L1 caches 111_1 to 111_N of FIG. 1 support cache lookups based on a virtual address rather than a physical address. For example, when an instruction is received for execution by processor 111_N to fetch an item of data or an instruction at a specific virtual address, the virtual address is used for the lookup into the L1 cache 111. The cache lookup can therefore be viewed as being "in-front of" rather than "behind" the TLB 118_N.

The shadow tag array can also be used to verify a "miss" of a virtual address based cache lookup. Here, sometimes, a same physical address may map to more than one virtual address (e.g., in the case of a same shared data item that is used by two different application software programs). According to one approach, if a cache line's physical address maps to more than one virtual address, it is possible that less than all the virtual addresses of the cache line will be listed for the cache line during the virtual address based cache look-up. As such, a "miss" will be registered for the look-up even though the desired cache line resides in the cache. As such, according to one process, after a virtual address based lookup into a cache results in a "miss", a virtual-to-physical address translation is performed with a TLB to identify the physical address of the desired cache line. The physical address of the desired cache line is then presented to the shadow tag array to see if the cache line actually resides in the cache.

Note that, in the case of a virtual address cache look-up that truly misses, five lookups are performed end-to-end. For example, if core 101_1 desires a cache line, core 101_1 first performs a first virtual address based lookup into L1 cache 111_1 (the first lookup). Then, in response to a miss, a virtual to physical address translation is performed in TLB 118_1 (the second lookup) to obtain the physical address of the desired cache line. Then, a physical address based lookup is performed into shadow tag array 117_1 (the third lookup) to see if, in fact, the L1 cache 111_1 actually has the cache line (but it was not detected via the first lookup because it has multiple translations).

If the third lookup results in a miss, a snoop request is sent to the snoop filter 113 which performs a look-up into storage circuitry 114 (the fourth lookup). If the result of the lookup in the snoop filter 113 indicates that another core has the cache line, e.g., core 101_N, the snoop request is forwarded to that core 101_N and a final (fifth) lookup is performed in the shadow tag array 117_N of the core 111_N. The result of the lookup identifies where the cache line resides in the L1 cache 111_N of the core 101_N.

Figure 2:
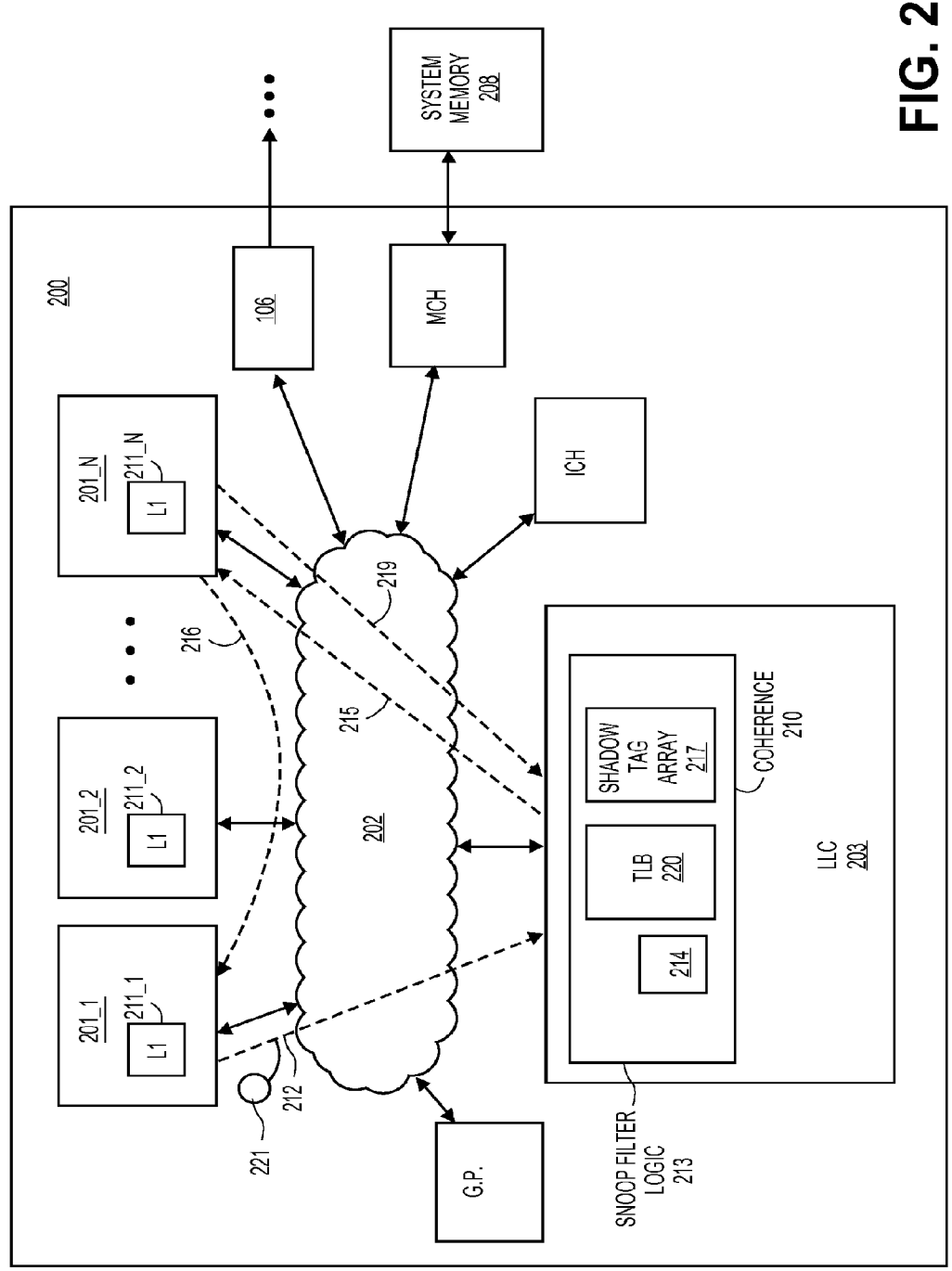
FIG. 2 shows an improved multi-core processor and associated process.

FIG. 2 shows an architecture for a processor 200 aimed at reducing the number of lookups. As observed in FIG. 2, and in comparison to FIG. 1, the shadow tag arrays have been removed from the individual cores 201_1 to 201_N. Instead, a centralized shadow tag array 217 has been placed in the snoop filter logic circuitry 213 within the coherence logic circuitry 210. The centralized shadow tag array 217 not only includes information describing which cache lines are being cached by which cores 201_1 to 201_N, but also, specifically, where a cache line resides within a particular cache. Said another way, centralized shadow tag array 217 has tag information that not only correlates a particular cache line's physical address to the particular cache amongst caches 211_1 through 211_N where the cache line resides, but also, provides additional information (above and beyond that provided by storage circuitry 114) that specifies where the cache line resides within the identified cache.

Moreover, a centralized TLB 220 exists in the snoop filter logic 213. The centralized TLB 220 contains virtual address-to-physical address translations for each of the cores 201_1 to 201_N in the processor 200. The presence of the centralized TLB 220 and shadow tag array 217 in the snoop filter logic 213 can reduce the number of look-ups for a typical case when a first virtual address based look-up misses as described immediately below. More generically, the centralized TLB 220 may be implemented as translation circuitry that contains virtual address-to-physical address translations for each of the cores 201_1 to 201_N in the processor 200 (rather than a translation look-aside buffer specifically). For convenience the remainder of the document will refer to a TLB. However, it should be understood that implementations may exist in which translation circuitry rather translation look-aside buffer circuitry specifically is utilized.

If core 201_1 desires a cache line having a particular virtual address, the core 201_1 performs a first virtual address based look-up into L1 cache 211_1. In the case of a miss, a snoop request having the virtual address is sent 212 to the snoop filter logic 213. Note that the snoop request 112 of the prior art processor 100 of FIG. 1 contained the physical address of the desired cache line and not its virtual address. This follows as a direct consequence of the fact that before the prior art snoop request 112 is sent, a TLB translation is performed beforehand in the core that issues the request 112. The TLB translation is performed on the prior art core 101_1 to prepare for a lookup into the shadow tag array 117_1 on the prior art core 101_1. By contrast, no such TLB translation needs to be performed on core 201_1 of the processor 200 of FIG. 2 because the core 201_1 does not contain a shadow tag array.

When the snoop filter logic circuitry 213 receives the snoop request 212, it uses the virtual address contained therein to perform a TLB translation with the centralized TLB 220. The resulting physical address is then used as an input lookup parameter to the centralized shadow tag array 217. If the cache line is within any of the cores 201_1 to 201_N of the processor 200, the centralized shadow tag array 217 will provide not only the identity of the core, but also, the location within the cache of the core as well. For example, if the cache line desired by core 201_1 resides in the L1 cache 211_N of core 201_N, the centralized shadow tag array 217 will present tag information that not only identifies core 201_N, but also, a specific location in cache 211_N where the cache line resides.

In an embodiment, the original snoop request 212 also includes information 221 that specifies the specific location within cache 211_1 where the desired cache line will be located in cache 211_1 upon its reception of it. The reason for providing this information 221 and how it is used will be discussed in more detail further below.

Continuing with the example, assuming the desired cache line resides in cache 211_N of core 201_N and the centralized shadow tag array 217 provides that information, a forwarded snoop request 215 is sent from the snoop filter logic 213 to core 201_N. Here, the forwarded snoop request 215 includes the specific location in cache 211_N where the cache line resides. As such, core 201_N need not perform any lookup to obtain this information. It applies this information received in the snoop request 215 to directly fetch the desired cache line from cache 211_N. Core 201_N then forwards 216 the cache line to core 201_1 (both snoop requests contain the identity of the originally requesting core 201_1). Core 201_N also sends a confirmation 219 of the transaction to the snoop logic 213. With the confirmation of the transaction 219, snoop logic 213 updates the centralized shadow tag array 217 with the information 221 provided by core 201_1 in the original snoop request 212 that identifies the specific location in the cache 211_1 where the desired cache line resides. As such, if another core requests the same cache line, the same process can be repeated with the correct location of the desired cache line.

Figure 3:
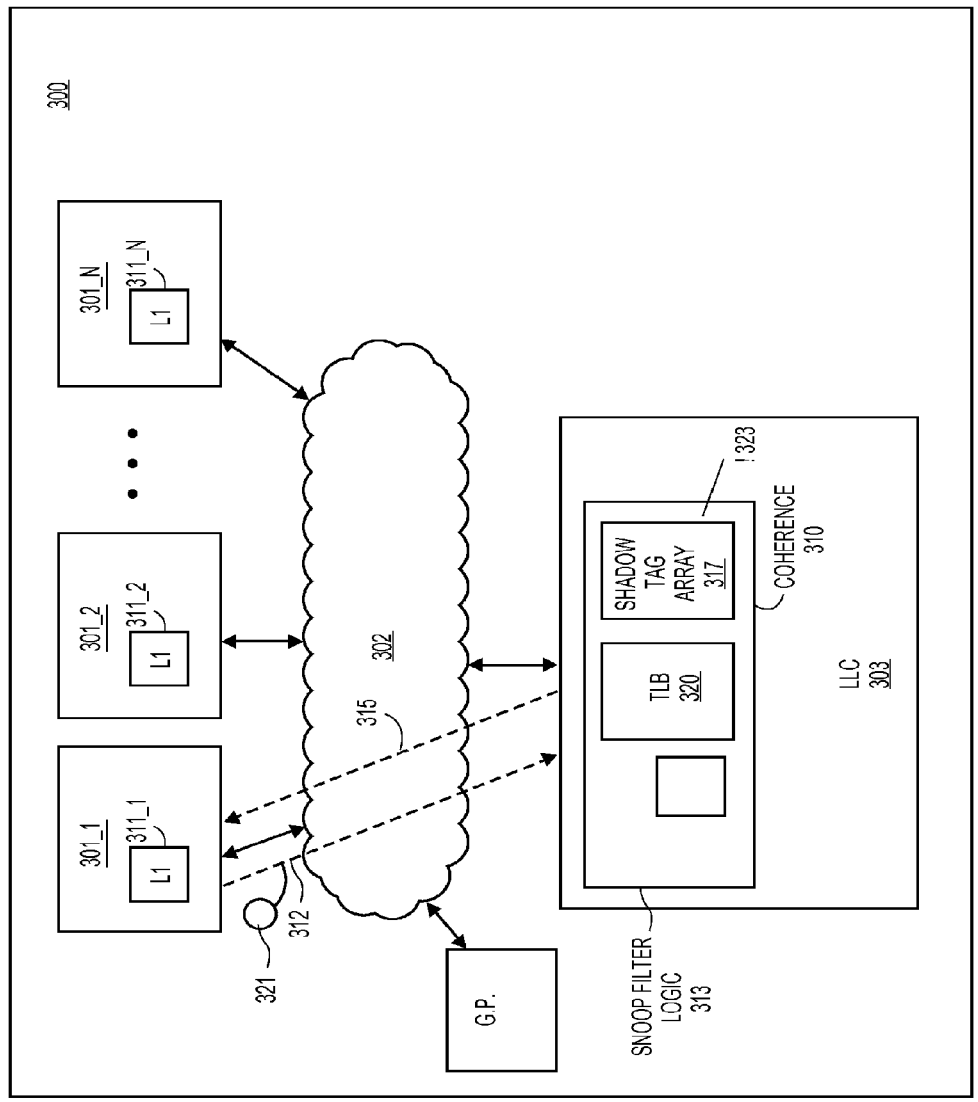
FIG. 3 shows another associated process of the improved multi-core processor of FIG. 2.

FIG. 3 pertains to a process where the initial virtual address based look up in cache 311_1 results in a miss even though the desired cache line resides in the cache 311_1 (owing to the fact that the physical address of the cache line maps to more than one virtual address). Because the initial virtual address based look up results in a miss, a snoop request 312 is sent to the snoop logic 313. Like before, the snoop request contains:

i) the identity of the requesting core (201_1); ii) the virtual address of the cache line; and, iii) the specific location 321 in cache 311_1 where the cache line will be placed in cache 311_1 once it is obtained.

As before, snoop filter logic 313 performs a TLB translation with the centralized TLB 320 and uses the physical address provided by the TLB translation as a look-up parameter into the centralized shadow tag array 317. Here, the snoop logic 313 detects 323 that the core 301_1 that the desired cache line resides in (as determined from the result provided by the shadow tag array 317) is the same core 301_1 that sent the original snoop request 312. The information describing exactly where the cache line resides in cache 311_1, as provided by the centralized shadow tag array 317, is sent 315 to the originally requesting core 301_1 which uses the information to directly fetch the desired cache line from cache 311_1.

Figure 4:
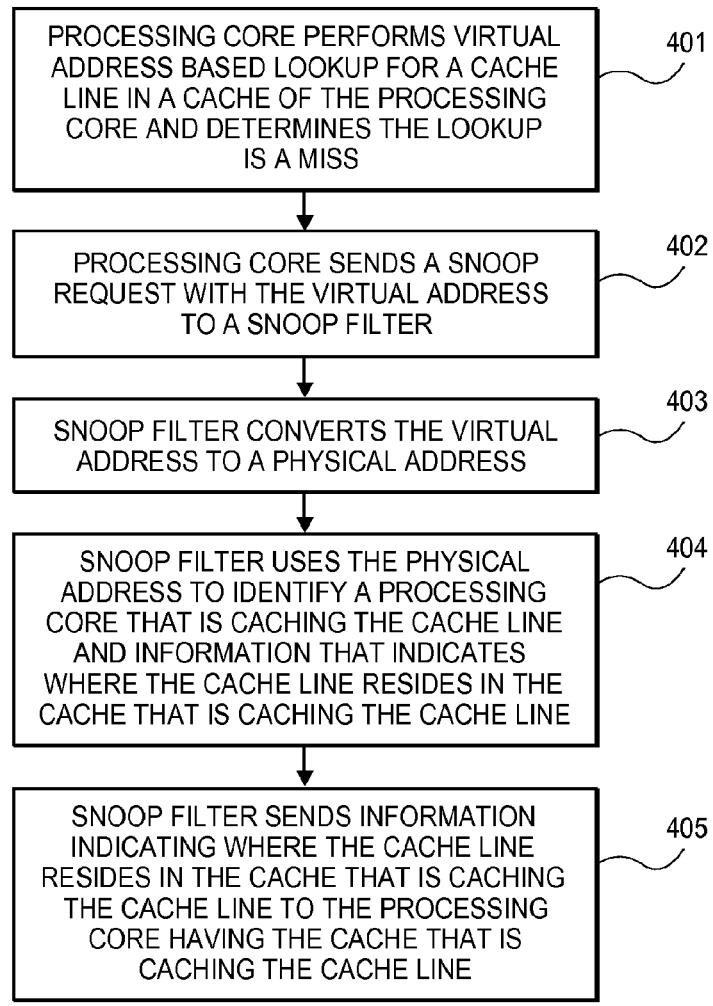
FIG. 4 shows a flow diagram of a process performed by the improved multi-core processor.

FIG. 4 shows a flow chart describing processed described above. According to the flow chart a processing core performs a virtual address based cache lookup for a cache line and determines that the cache lookup is a miss 401. The processing core then sends a snoop request containing the virtual address to a snoop filter 402. The snoop filter converts the virtual address to a physical address 403. The snoop filter uses the physical address to determine the identity of the processing core that is caching the cache line and information pertaining to a location within a cache of the processing core that is caching the cache line where the cache line resides 404. The snoop filter then sends the information to the processing core that is caching the cache line 405.

In an embodiment, when the snoop filter logic 313 detects that the desired cache line is in the same core and/or cache to which the original snoop request 312 pertains, it ignores the information 321 in the original request 312 describing where the desired cache line will be located once it is obtained (on the theory that since the requesting core already has the desired cache it need not move it). In furtherance of this embodiment, the requesting core 301_1, upon detecting that it serviced its own request, likewise does not move the cache line but keeps it in its place.

In an alternative embodiment, the cache line is moved in the requesting core. As such, no detection 323 that the cache line resides in the originally requesting core needs to be made, and, upon confirmation of the transaction received at the snoop logic 313, the snoop logic updates the array 317 with the new (moved to) location of the desired cache line.

In another possible implementation, either of these two behaviors is selectable through a configuration register.

A hybrid architecture between that of FIG. 1 and FIGS. 2 and 3 is also possible where the TLBs are kept on the processing cores but a centralized shadow tag array exists within the snoop filter logic. Here, the processes as described above for FIGS. 2 and 3 take place but TLB look-ups are performed on the individual cores resulting in original snoop requests containing physical addresses as opposed to virtual addresses. The physical address is presented to the centralized shadow tag array which provides the information describing not only what cache/core the desired cache line resides in, but also, where in the cache the desired cache line resides. The remainder of the processes follow as described in FIGS. 2 and 3.

Note that the above described circuits and processes can be applied for cache lines of instructions, cache lines of data or both.

In the foregoing specification any of the components and/or processes discussed above can be implemented with electronic circuitry such as a logic circuitry disposed on a semiconductor chip and/or storage circuitry (e.g., register circuitry, memory cell circuitry, etc.) for any such circuit described above that is used to hold information (such as the centralized TLB and centralized shadow tag array). In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
   a plurality of processing cores; and
   snoop filter logic circuitry coupled to said plurality of processing cores, said snoop filter logic circuitry having translation circuitry and a tag array, said translation circuitry to identify a physical address for a cache line in response to receipt at said snoop filter logic circuitry of a snoop request with a virtual address of said cache line from any one of said processing cores, said tag array to identify from the physical address from the translation circuitry which of said plurality of processing cores is caching said cache line and where said cache line is cached in a respective cache of said one which of said plurality of processing cores is caching said cache line.

2. The processor of claim 1 wherein said snoop filter logic circuitry is to insert into said tag array an identifier of said cache line's location in said respective cache as part of processing said snoop request.

3. The processor of claim 2 wherein said snoop filter logic circuitry does not implement said insert if a core that sends said snoop request is the same as the core that is determined to be holding said cache line.

4. The processor of claim 1 wherein said snoop filter logic circuitry is to send a forwarded version of said snoop request to said which of said plurality of processing cores is caching said cache line, said forwarded version containing information identifying where said cache line is cached in said respective cache.

5. The processor of claim 4 wherein said which of said plurality of processing cores is caching said cache line contains logic circuitry to use said information to fetch said cache line.

6. The processor of claim 1 further comprising an interconnection network between said plurality of processing cores and said snoop filter logic circuitry.

7. The processor of claim 1 wherein said snoop filter logic circuitry is within coherence plane logic circuitry of a last level cache of said processor.

8. A method comprising:
   performing a virtual address based cache look-up for a cache line in a first processing core;
   determining at said first processing core that the virtual address based cache look-up is a miss;
   sending a snoop request with a virtual address of said cache line from said first processing core to a snoop filter;
   performing a virtual address to physical address translation within said snoop filter to determine a physical address for said virtual address;
   using said physical address within said snoop filter to determine which processing core of a plurality of processing cores is caching said cache line and determine location information to indicate where said cache line is being cached within a cache that is caching said cache line;
   sending said location information to whichever processing core was determined to be caching said cache line; and said processing core determined to be caching said cache line using said location information to fetch said cache line.

9. The method of claim 8 wherein said processing core determined to be caching said cache line is different than said processing core and sends said cache line to said processing core.

10. The method of claim 9 wherein said snoop filter sends said location information along with an identity of said processing core to said processing core determined to be caching said processing core.

11. The method of claim 9 wherein said processing core sends second location information as part of said snoop request, said second location information identifying where said cache line will be cached within a cache of said processing core upon its receipt of said cache line.

12. The method of claim 11 further comprising said snoop filter updating an array by replacing said location information with said second location information.

13. The method of claim 8 wherein said processing core determined to be caching said cache line is said processing core.

14. The method of claim 9 wherein said processing core sends second location information as part of said snoop request, said second location information identifying where said cache line will be cached within a cache of said processing core upon its receipt of said cache line, and said snoop filter does not replace said location information with said second location information.

15. A processor comprising:
a plurality of processing cores each having a first level cache; and
snoop filter logic circuitry in a second level cache and coupled to said first level caches of the plurality of processing cores, said snoop filter logic circuitry having translation circuitry and a tag array, said translation circuitry to identify a physical address for a cache line in response to receipt at said snoop filter logic circuitry of a snoop request with a virtual address of said cache line from any one of said processing cores, said tag array to identify from the physical address from the translation circuitry which of said plurality of processing cores is caching said cache line and where said cache line is cached in a respective first level cache of said which of said plurality of processing cores is caching said cache line.

16. The processor of claim 15 wherein said snoop filter logic circuitry is to insert into said tag array an identifier of said cache line's location in said respective cache as part of processing said snoop request.

17. The processor of claim 16 wherein said snoop filter logic circuitry does not implement said insert if a core that sends said snoop request is the same as the core that is determined to be holding said cache line.

18. The processor of claim 15 wherein said snoop filter logic circuitry is to send a forwarded version of said snoop request to said which of said plurality of processing cores is caching said cache line, said forwarded version containing information identifying where said cache line is cached in said respective cache.

19. The processor of claim 18 wherein said which of said plurality of processing cores is caching said cache line contains logic circuitry to use said information to fetch said cache line.

20. The processor of claim 15 wherein said second level cache is a last level cache.

* * * * *